(12) United States Patent
Kondo et al.

(10) Patent No.: US 9,448,334 B2
(45) Date of Patent: Sep. 20, 2016

(54) OPTICAL WAVEGUIDE AND DRY FILM FOR OPTICAL WAVEGUIDE PRODUCTION

(71) Applicant: Panasonic Intellectual Property Management Co., Ltd., Osaka (JP)

(72) Inventors: Naoyuki Kondo, Osaka (JP); Junko Kurizoe, Osaka (JP); Shinji Hashimoto, Osaka (JP); Toru Nakashiba, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 69 days.

(21) Appl. No.: 14/412,424

(22) PCT Filed: Jul. 2, 2013

(86) PCT No.: PCT/JP2013/004089
§ 371 (c)(1),
(2) Date: Apr. 27, 2015

(87) PCT Pub. No.: WO2014/006878
PCT Pub. Date: Jan. 9, 2014

(65) Prior Publication Data
US 2015/0234095 A1 Aug. 20, 2015

(30) Foreign Application Priority Data
Jul. 2, 2012 (JP) ................................. 2012-148623

(51) Int. Cl.
*G02B 1/04* (2006.01)
(52) U.S. Cl.
CPC ........ *G02B 1/048* (2013.01); *Y10T 428/31511* (2015.04)

(58) Field of Classification Search
None
See application file for complete search history.

(56) References Cited

U.S. PATENT DOCUMENTS

| 8,357,483 B2 | 1/2013 | Kim et al. |
| 2009/0286020 A1 | 11/2009 | Asai et al. |
| 2010/0081089 A1 | 4/2010 | Kim et al. |

FOREIGN PATENT DOCUMENTS

| JP | 07-199457 A | 8/1995 |
| JP | 08-339081 A | 12/1996 |
| JP | 2006-071880 A | 3/2006 |
| JP | 2006-317698 A | 11/2006 |
| JP | 2009-046604 A | 3/2009 |

(Continued)

OTHER PUBLICATIONS

Written Opinion and International Search Report issued in International Patent Application No. PCT/JP2013/004089 dated Sep. 24, 2013 (Partial English translation).

(Continued)

*Primary Examiner* — Michelle R Connelly
*Assistant Examiner* — John M Bedtelyon
(74) *Attorney, Agent, or Firm* — McDermott Will & Emery LLP

(57) ABSTRACT

The present invention provides an optical waveguide excellent in all of transparency, a bending property and heat resistance and a dry film for manufacturing an optical waveguide. A clad layer of the optical waveguide according to the present invention is formed by using a dry film containing a polymer comprising at least a (meth)acrylate monomer with an epoxy group and a (meth)acrylate monomer without an epoxy group; and cationic or anionic curing initiator.

12 Claims, 2 Drawing Sheets

(56) References Cited

FOREIGN PATENT DOCUMENTS

| | | |
|---|---|---|
| JP | 2009-086058 A | 4/2009 |
| JP | 2009-120737 A | 6/2009 |
| JP | 2010-524042 A | 7/2010 |
| JP | 2014-009334 A | 1/2014 |
| TW | I328716 B | 8/2010 |
| WO | 2008/001722 A | 1/2008 |

OTHER PUBLICATIONS

Office Action and Search Report of Taiwanese Patent Application No. 102123751 (Partial English translation).
PCT/IPEA 416 and 409 issued in International Patent Application No. PCT/JP2013/004089 dated Oct. 7, 2014.
Translation of the International Preliminary Report on Patentability dated Jan. 8, 2015, issued in corresponding International Application No. PCT/JP2013/004089. 6 pgs.

OPTICAL WAVEGUIDE AND DRY FILM FOR OPTICAL WAVEGUIDE PRODUCTION

RELATED APPLICATIONS

This application is the U.S. National Phase under 35 U.S.C. §371 of International Application No. PCT/JP2013/004089, filed on Jul. 2, 2013, which in turn claims the benefit of Japanese Patent Application No. 2012-148623, filed on Jul. 2, 2012, the disclosures of which are incorporated by reference herein.

BACKGROUND OF THE INVENTION

1. Field of the Invention

The present invention relates to an optical waveguide excellent in all of transparency, a bending property and heat resistance; and a dry film for manufacturing the optical waveguide.

2. Background Art

Optical fibers were mainly used as a transmission medium in fields of a data communication service for family use which is known as FTTH (Fiber To The Home), and long-distance and medium-distance communication for vehicles. Recently, high speed transmission using a light becomes necessary even for a short-distance within 1 m. In this area, optical-waveguide-type optical wiring boards are suitable because they can achieve high density wiring (a narrow pitch, a junction, an intersection, multilayer, etc.), surface mounting, integrating with an electrical substrate, bending at a small radius, what optical fibers cannot achieve.

Optical wiring boards involve generally the following two types. The first type is a substitution for PWB used for printed wiring boards. The second type is a substitution for FPC used for hinges in small terminal device. Since both types require electrical wiring and transmission of low-speed signals for operating VCSELs (Vertical Cavity Surface Emitting Lasers) and PDs (Photo Diodes) which are light receiving elements, IC and the like, an ideal form is a photoelectric composite wiring board on which optical circuits and electric circuits are mounted together.

A polymeric waveguide has been considered to be used for hinge parts of portable terminals because it allows high-speed transmission of a device as well as weight reduction, downsizing and space saving when used in optical circuits. Polymeric materials used for optical circuits are demanded to have transparency within a wave length range used, generally, a visible light range and further demanded to have a bending property when used for hinge parts. For example, in order to downsize a portable terminal, it is required that operation with bending at a small bend radius does not cause a fracture, and a bending property is required severer year after year. In addition, a region where an optical circuit is unnecessary may be formed on a substrate and, then, materials are demanded to have a patterning property.

For parts necessary for optical communication, a mounting step by lead-free solder reflow is required and they have to satisfy reliability tests such as a thermal cycling test, a high-temperature high-humidity test and the like for environmental load. Therefore, polymeric materials are demanded to have heat resistance.

Furthermore, as a process of forming a core layer or a clad layer constituting an optical waveguide, a method of molding a liquid material by a spin coating, bar coating and the like and a method of laminating a dry film material in a solid state at a normal temperature with a press machine on a vacuum laminator are generally used. A dry film material is more desirable because it may become a film by vacuum lamination, resulting in excellent productivity. In this case, such a film is demanded to have tackiness wherein a film appropriately adheres to a substrate and ductility wherein dusts do not generate by breaking an uncured resin layer of a dry film upon handling a film, are required.

As above, with respect to resins used in manufacturing an optical waveguide, before curing, tackiness and ductility are required for an uncured resin layer, and a patterning property is required during processing; and further, for cured products, transparency, a bending property and heat resistance are required.

3. Related Art

Patent document 1 discloses a photosensitive resin composition containing an addition product of carboxyl group-containing resin with an unsaturated compound comprising an $\alpha,\beta$-unsaturated double bond and an epoxy group, such as glycidyl acrylate, glycidyl methacrylate and derivative thereof, and methacrylate with an epoxy cyclohexyl group; and a dry film made from the aforementioned composition.

Patent documents 2 to 4 disclose an active energy line-curable optical composition which comprises a compound derived from epoxy resin having a biphenol structure with an epoxy group within a main chain and which provides a cured product excellent in heat resistance, humidity resistance and tenacity, and showing a high refractive index; and a dry film made from the aforementioned composition.

Patent document 5 discloses a photoelectricity mixed substrate having an adhesive layer made of a cured product of a radiation-curable composition comprising a compound having at least one (meth)acryloyl group and at least one epoxy group.

Patent document 6 discloses a heat resistant photosensitive resin composition comprising an unsaturated double bond-containing epoxy resin; and a dry film using it.

In addition, Patent documents 2 and 5 disclose that such a composition may be used for an optical waveguide.

4. Citation List

Patent document 1: JP H08-339081A
Patent document 2: WO 2008/001722A
Patent document 3: JP 2009-046604A
Patent document 4: JP 2009-120737A
Patent document 5: JP 2009-086058A
Patent document 6: JP H07-199457A

SUMMARY OF THE INVENTION

In order to manufacture optical circuits such as an optical waveguide excellent in all of transparency, a bending property and heat resistance, it is required to use a resin composition combining all of high properties demanded in a variety of situations.

Conventionally, in order to invest a cured resin product with a bending property, (1) a method of reducing crosslink density by reducing a content of reactive groups in resin; and (2) a method of entangling molecules by making molecular weight higher to form thermoplastic resin have been adopted.

However, when crosslink density is reduced, a problem occurs that a glass transition temperature (Tg) becomes lower to deteriorate heat resistance. Further, thermoplastic resin lacks crosslinking between molecules. Therefore, a problem occurs that solvent resistance is insufficient and a patterning property cannot be invested.

On the other hand, although a crosslink density is usually increased in order to invest heat resistance, heat resistance improves, and a bending property is insufficient. As above, no resin composition currently exists, which combines all of a patterning property during processing; and transparency, a bending property, heat resistance for cured products.

Therefore, the object of the present invention is to manufacture optical circuits such as an optical waveguide excellent in all of transparency, a bending property and heat resistance by using a resin composition combining all of high properties demanded in a variety of situations.

Then, the present inventors studied a resin composition useful for manufacturing optical circuits such as an optical waveguide. As a result, they have found that a resin composition containing as an epoxy curable component a polymer obtained by polymerizing monomers comprising a (meth)acrylate monomer with an epoxy group and a particular (meth)acrylate monomer without an epoxy group is excellent in a patterning property during processing; and its cured product obtained by a three-dimensional crosslinking reaction of epoxy groups with a curing initiator is excellent in transparency, a bending property and heat resistance. Accordingly, it is found that an optical waveguide having a clad layer formed by using such a resin composition is excellent in transparency and a bending property. Further, an uncured product of such a resin composition is excellent in tackiness and ductility, and useful for manufacturing an optical waveguide.

Since an optical waveguide according to the present invention is excellent in transparency and a bending property, when it is used in optical circuits, it allows high speed transmission as well as weight reduction, downsizing and space saving. Further, when a dry film according to the present invention is used, a homogeneous optical waveguide may be easily manufactured.

DETAILED DESCRIPTION OF THE INVENTION

Figure 1:
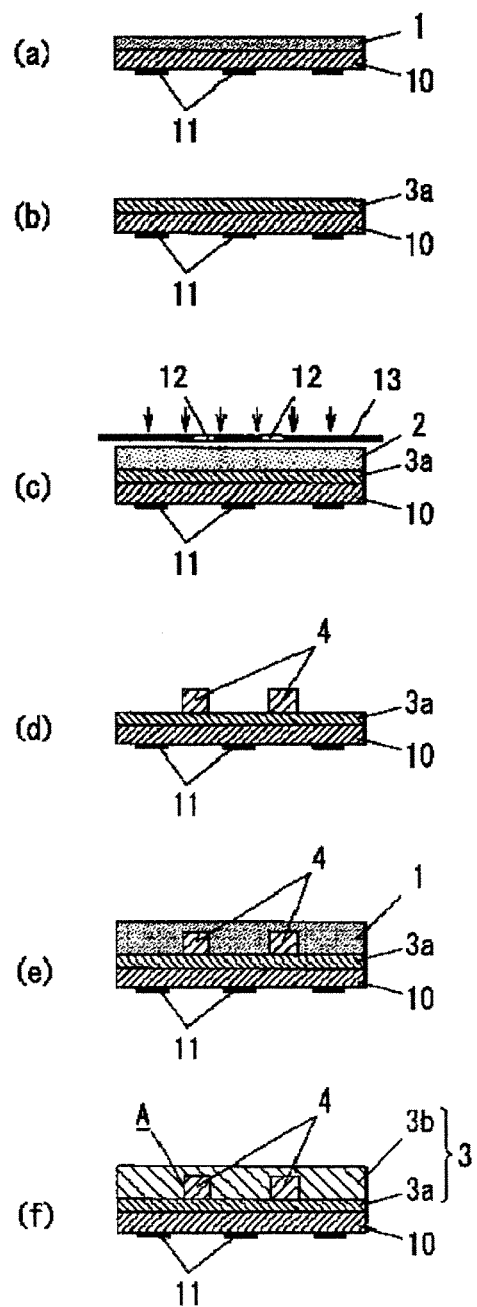
FIG. 1 is a schematic illustration demonstrating a method of manufacturing an optical waveguide by using a dry film.

The present invention provides, as one embodiment, an optical waveguide comprising a core and a clad enveloping the core, wherein at least the clad is a cured product by epoxy crosslinking a polymer comprising a (meth)acrylate monomer with an epoxy group (A) and a (meth)acrylate monomer without an epoxy group (B) represented by the general formula (1):

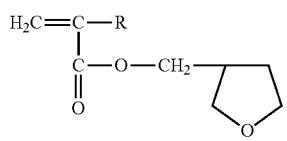

(1)

wherein R denotes hydrogen or a methyl group.

Hereinafter, a (meth)acrylate monomer with an epoxy group may be called an "epoxy monomer" and a (meth)acrylate monomer without an epoxy group may be called a "non-epoxy monomer"

A polymer for obtaining a cured product by epoxy crosslinking in the present invention is produced by polymerizing given monomers by a known method. Namely, polymerization methods such as random copolymerization, block copolymerization and the like may be adopted when expressed based on a repeating unit of a produced polymer. Alternatively, polymerization methods such as radical polymerization, ionic polymerization (anion polymerization, cation polymerization), coordination polymerization and the like may be adopted when expressed based on characteristics of a polymerization initiator. Furthermore, a living polymerization method may be adopted when expressed from a viewpoint that a polymerization reaction site maintains its activity until a reaction termination step is carried out.

In addition, the present invention provides, as another embodiment, a dry film comprising at least a carrier film and an uncured resin layer of an epoxy resin composition, which is formed as a film on the carrier film, wherein the epoxy resin composition contains a polymer comprising a (meth)acrylate monomer with an epoxy group (A) and a (meth)acrylate monomer without an epoxy group (B); and a cationic or anionic curing initiator.

This dry film may have a releasing film for protecting the uncured resin layer.

In the present invention, it is preferred that the epoxy monomer (A) is epoxycyclohexylmethyl (meth)acrylate represented by the general formula (2):

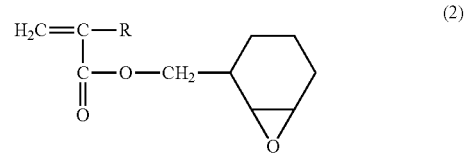

(2)

wherein R denotes hydrogen or a methyl group; or glycidyl (meth)acrylate represented by the general formula (3):

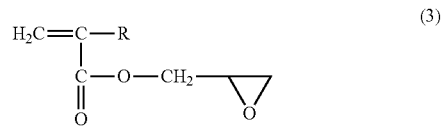

(3)

wherein R denotes hydrogen or a methyl group; or a mixture thereof.

In the case of the above formulation, its uncured resin layer has high ductility, its cured product becomes excellent in transparency, a bending property and heat resistance.

In the present invention, a formulation ratio of epoxy monomer (A) and a non-epoxy monomer (B) is preferably a molar ratio of 1:1-1:20. The formulation ratio is more preferably a molar ratio of 1:1-1:13, and further preferably a molar ratio of 1:5-1:10.

When the formulation ratio is less than 1:1, since epoxy monomer (A) is much and an epoxy crosslink density in a cured product becomes too high, flexibility of the cured product is insufficient. When the formulation ratio is more than 1:20, since epoxy monomer (A) is less and an epoxy crosslink density in a cured product is too low, strength of the cured product is insufficient.

In the present invention, an epoxy equivalent of the polymer comprising epoxy monomer (A) and non-epoxy monomer (B) is preferably 250-5,000 (g/eq).

When the epoxy equivalent is less than 250, since an epoxy crosslink density in a cured product becomes too high, flexibility of the cured product is insufficient. When the epoxy equivalent is more than 5,000, since an epoxy crosslink density in a cured product is too low, strength of the cured product is insufficient.

An epoxy equivalent of an epoxy group-containing polymer may be measured by a method according to JIS K 7236:2009 and it may be calculated from a molecular structure.

In the present invention, a weight-average molecular weight of the polymer (by GPC eluted with a THF solvent; polystyrene equivalent) is preferably 50,000-500,000. The weight-average molecular weight of the polymer is more preferably 80,000-300,000.

When the weight-average molecular weight is less than 50,000, flexibility of the cured product is insufficient. When the weight-average molecular weight is more than 500,000, since a varnish viscosity becomes too high, it is difficult to form a good resin layer in a dry film; and since a resin layer is hard to be softened when it is imprinted on a substrate and the like, a laminate property is deteriorated. Further, when the molecular weight is within the above range, since the epoxy resin composition is excellent in miscibility with raw materials such as solvents and the like, transparency of a resin layer in a dry film improves and developability is also excellent.

The polymer according to the present invention which comprises epoxy monomer (A) and non-epoxy monomer (B) can be called as epoxy resin because it has an epoxy group, and also as a base polymer. However, since the non-epoxy monomer has a tetrahydrofuran skeleton, solubility of the polymer in an organic solvent which is required to prepare a resin solution (varnish) may be enhanced. Further, since miscibility of the polymer with other epoxy resin used in a composition comprising the polymer may be enhanced, a cured product of an epoxy resin composition which is finally obtained by using the polymer shows excellent transparency.

Epoxycyclohexylmethyl (meth)acrylate represented by the general formula (2) and glycidyl (meth)acrylate represented by the general formula (3) invests a polymer comprising them with curability as epoxy resin. Epoxycyclohexylmethyl (meth)acrylate represented by the general formula (2) has a so-called "internal epoxy" structure and, for cation curing which is one of means for curing epoxy groups, it shows a curing property more excellent than glycidyl (meth)acrylate represented by the general formula (3) which has a so-called "external epoxy" structure. This characteristic is utilized to select and determine a usage ratio regarding epoxycyclohexylmethyl (meth)acrylate represented by the general formula (2) and glycidyl (meth) acrylate represented by the general formula (3) depending on demanded levels for heat resistance and a bending property of a cure product of a finally-obtained epoxy resin composition.

Additionally, in the polymer according to the present invention, a variety of monomers may be used together other than the monomers mentioned above as long as the object of the present invention is not impeded. A monomer may be used together, which has a structure in which an electron-withdrawing group such as a carbonyl group, an aromatic ring, a halogen, and a nitro group is attached to at least one carbon in a vinyl group. Examples include styrene, methylstyrene; a compound having a vinyl group and a naphthalene skeleton in its molecule; a compound having a vinyl group and a fluorene skeleton its molecule; ester of alcohol having a cyclic aliphatic skeleton with (meth)acrylic acid; ester of alcohol having a straight or branched aliphatic skeleton such as methanol, ethanol, butanol, isobonyl alcohol and the like with (meth)acrylic acid; ester of alcohol having an oxetane skeleton with (meth)acrylic acid; and the like. Among them, when a monomer having an aromatic skeleton such as styrene, methylstyrene; a monomer having a naphthalene skeleton or fluorene skeleton are used together, since they can enhance a refractive index of a cured product of an epoxy resin composition using a polymer as a function of usage ratio comparing with when only a monomer without an aromatic skeletons used, it is very preferable especially for applications requiring adjustment of a refractive index in a field of optics.

The polymer according to the present invention does not involve a carboxyl group as an essential element for alkali solubilization unlike those generally used for a curable resin for an alkali-developable negative dry film material. Further, a curing system for obtaining an epoxy-crosslinked cured product according to the present invention is different from a curing system of the alkali-developable negative resin. That is, the resin for a cured product according to the present invention comprises a polymer comprising an epoxy monomer and a non-epoxy monomer; and a curing initiator capable of curing epoxy groups by crosslinking. On the other hand, the alkali-developable negative resin comprises a compound containing a polymer comprising a monomer with a carboxyl group as a base polymer and an ethylenic double bond; and a curing initiator capable of curing the ethylenic double bonds by crosslinking. When alkali development is required, carboxyl groups should exist at certain content or more, while when alkali development is not required, a carboxyl group for developing is not essential. From a viewpoint of reliability for an electrical insulating property of a cured product, lesser a content thereof may be better. Carboxyl group-containing monomers is preferably 5% or less, more preferably 1% or less with respect to the whole monomers by converting to a molar ratio to raw material monomers constituting the polymer. It may be best that intentionally no carboxyl group-containing monomer is used as a raw material monomer.

In the present invention, liquid epoxy resin is added preferably at 5-35 weight % with respect to the whole resin composition.

In this case, by adding a liquid epoxy in the resin formulation, tackiness of an uncured resin layer may be improved. Further, since an uncured resin layer becomes excellent in ductility, breaking and dusting decrease. Then, when the content of the liquid epoxy resin is less than 5%, since tackiness of the obtained uncured resin layer deteriorates, flexibility of a film before curing becomes insufficient and a handling property is poor. On the other hand, when the content is more than 35%, since tackiness of the obtained uncured resin layer becomes too high, entering of air bubbles is prone to occur upon imprinting the resin layer from the dry film on a substrate and the like.

Below, detailed embodiments of the present invention will be explained more specifically.

In the embodiment, an optical waveguide comprising a core and a clad enveloping the core on a flexible board is manufactured. This optical waveguide may be manufactured, for example, by the following steps.

Step 1:

On a flexible board, a transparent first resin layer is laminated to form an underclad. Then, as the first resin layer, an epoxy resin composition film in the dry film may be adopted. That is, the dry film is laminated on a flexible board and a carrier film is stripped to imprint the epoxy resin composition film. Thereby, a resin layer for an underclad may be formed. This resin layer for an underclad is cured by irradiating an energy line or heating to form an underclad.

When an underclad is formed on only a part, not the whole of a resin layer for an underclad imprinted on a flexible board, a resin layer for an underclad which has a characteristic of being cured with an energy line is used and patterned. The term "patterning" used here means a step comprising at least developing treatment in which a resin layer for an underclad is cured by irradiating only a part to be formed at a required dose of an energy line, followed by dissolving to remove a part wherein the energy line is not irradiated at a required dose.

Step 2:

On the underclad, a transparent second resin layer is laminated to form a core. Then, the second resin layer used for forming a core may be anything as long as, when it is cured, it has transparency as well as a refractive index higher than the refractive index of the cured first resin layer used for forming a clad consisting of an underclad and an overclad. As a material for the second resin layer, a material different from that for the first resin layer may be used; and a material in which another material is added to the material for the first resin layer to adjust its refractive index, or a material in which a proportion of the respective raw materials of the first resin layer is changed to adjust its refractive index may be used.

In addition, as a method of laminating the second resin layer, a dry film for forming a core, which has the same structure as the aforementioned dry film and is different from it in a point that the epoxy resin composition is for a core of a wave guide, is used to imprint a core-forming resin film on the underclad to form a core-forming layer and, patterning is carried out into a core shape. The term "patterning" used here means the same as patterning of the underclad.

Step 3:

On the underclad and the core, the first resin layer is laminated to form a resin layer for an overclad. Then, the dry film used in Step 1 is used to imprint a resin film on the underclad and the core and, further it is cured to form an overclad. Specific matters are the same as those explained with respect to formation of an underclad.

[Resin Composition for Forming a Clad]

Below, components of the resin composition for forming a clad will be explained.

(Epoxy Monomer)

An epoxy monomer (A) which may be used in the present invention is one capable of forming a polymer with the following non-epoxy monomer such as epoxycyclohexylmethyl (meth)acrylate represented by the general formula (2) or glycidyl (meth)acrylate represented by the general formula (3), and its preferable examples include epoxycyclohexylmethyl methacrylate, and glycidyl methacrylate.

(Non-Epoxy Monomer)

A non-epoxy monomer (B) which may be used in the present invention is one having a structure represented by the general formula (1), and its preferable examples include tetrahydrofurfuryl methacrylate.

(Diluent)

A diluent which may be used in the present invention is, for example, methyl isobutyl ketone, toluene, methyl ethyl ketone, propylene glycol monoethyl ether acetate.

(Initiator)

In the present invention, similar terms "polymerizing" and "curing" are used differently for particular meanings. That is, the term "polymerizing" expresses converting a compound having addition-reactable (also referred to as "polymerizable") carbon-carbon double bonds such as so-called (meth)acrylic acid esters to generally straight oligomers or polymers. On the other hand, the term "curing" expresses altering a compound, oligomer or polymer with an epoxy group to a three-dimensional chemical structure through a reaction caused by a ring-opening reaction of epoxy groups. Further, in a resin system which may be used additionally wherein a compound having an addition-reactable carbon-carbon double bond is altered to a polymer having a three-dimensional chemical structure, this reaction is expressed as curing. In this case, curing and polymerization are the same from a viewpoint of elementary reactions and a kind of initiator. However, with respect to the explanation for the present invention, they are used properly in order to express a difference whether a polymer to be obtained is a generally linier polymer or a three-dimensional network polymer.

A polymerization initiator which may be used to prepare a certain polymer having an uncrosslinked epoxy group according to the present invention is not limited as long as an initiator which can initiate polymerization by cleaving a polymerizable double bond of a (meth)acrylate monomer, and a radical polymerization initiator, an anion polymerization initiator, a cation polymerization initiator may be used.

Examples of radical polymerization initiators include azo compounds such as 2,2'-azobisisobutylonitryl, 2,2'-azobis (2-methylpropionamidine) dihydrocloride salt; and an organic peroxide such as di(2-ethoxyethyl)peroxydicarbonate, lauroyl peroxide, and t-butyl peroxybenzoate. Examples for an anion polymerization initiator include an alkali metal, alkaline earth metal or organification compound thereof, organification compound of aluminum or zinc. Examples of a cation polymerization initiator include various Brønsted acids generating a hydrogen ion or various Lewis acids.

These polymerization initiators are not substantially contained or become substances without an ability to initiate polymerization in a polymer as a raw material added in an epoxy resin composition which is a precursor of a cured resin product constituting an optical waveguide because a chemical structure deformation occurs such as cleavage, transfer and the like upon initiation of polymerization; a quenching treatment is carried out upon completion of polymerization to lose activity; or elimination is carried out upon purification of polymer.

(Curing Initiator)

A curing initiator curing by crosslinking epoxy groups which may be used in the present invention is not particularly limited as long as that induces a crosslink reaction by opening epoxy groups, for example, a photoacid generator, a photobase generator, a thermal acid generator, thermal base generator and the like may be used. An acid generator generates a Lewis acid or a Brønsted acid with an active energy ray or heat and examples include aryldiazonium salts having $PF_6^-$, $AsF_6^-$, $SbF_6^-$, $SbCl_6^{2-}$, $BF_4^-$, $SnCl_6^-$, $FeCl_4^-$, $BiCl_5^{2-}$ and the like as an anion; diaryliodonium salts, triarylsulfonium salts, triarylselenonium salts, having $PF_6^-$, $AsF_6^-$, $SbF_6^-$, $SbCl_6^{2-}$, $BF_4^-$, $ClO_4^-$, $CF_3SO_3^-$, $FSO_3^-$, $F_2PO_2^-$, $B(C_6F_5)_4^-$ and the like as an anion; dialkylphenacyl sulfonium salts, dialkyl-4-hydroxyphenylsulfonium salts, having $PF_6^-$, $AsF_6^-$, $SbF_6^-$ and the like as an anion; sulfonic acid esters such as α-hydroxymethylbenzoinsulfonic acid ester, N-hydroxyimidosulfonic acid esters, α-sulfonyloxy ketone, β-sulfonyloxy ketone; and ironic arene compounds; silanol-aluminium complexes; o-nitrobenzyl-triphenyl silyl ethers; and the like. In addition, a base generator generates a base with an active energy ray or heat and examples include an α-aminoketone compound; a 2,4,5-triarylimidazole dimer; various phosphine oxides; compounds generating a base via photo Fries rearrangement, photo Claisen rearrangement, Curtius rearrangement, Stevens rearrangement; and the like. Specifically, for a photoacid generator (also referred to as a "photo cation initiator") as a photo-curing initiator, for example, CPI-101A and CPI-200K produced by San-Apro Ltd., SP-170 produced by Adeka Corporation may be used. As a photobase generator, for example, WPBG-018, WPBG-027, WPBG-082, WPBG-140, WPBG-165, WPBG-166, WPBG-167, WPBG-168, WPBG-172 produced by Wako Pure Chemical Industries, Ltd. and the like may be used.

Further, when a photo-curing initiator is used, various sensitizers may be used together in order to allow curing with a lesser light quantity (power) or with a lower energy light (a light having a longer wavelength).

Other curing initiators may be used together as long as the object of the present invention is not impeded. For example, a curing system using a compound having a polymerizable carbon-carbon double bond, which is different from an epoxy curing system, may be used together. In this case, for example, various radical curing initiators may be used together.

When patterning is unnecessary, a thermal-curing initiator may be also used. For example, various thermal acid generators and thermal base generators such as SI-150L produced by Sanshin Chemical Industry Co., Ltd. or various imidazole compounds which do not cause a curing reaction to a predetermined temperature (or which have potential) and the like may be used. Additionally, an imidazole compound is a curing initiator which can anionically polymerize an epoxy compound.

(Liquid Epoxy Resin)

In the present invention, a liquid epoxy resin may be added to a resin composition. This liquid epoxy resin is an epoxy resin in a liquid state at room temperature and, examples include bisphenol A epoxy resin, bisphenol F epoxy resin and hydrogenated bisphenol A epoxy resin, hydrogenated bisphenol F epoxy resin, alicyclic epoxy resin, biphenyl epoxy resin, Novolac epoxy resin, trimethilolpropane epoxy resin, polyethylene glycol epoxy resin and the like. Specifically, Epotot® YH300 produced by Nippon Steel Chemical Co., Ltd., Epikote® YX8000 produced by Mitsubishi Chemical Corporation, EPICLON® 850 S produced by Dainippon Ink and Chemicals, Inc. are included.

(Additives)

In the present invention, additives other than those cited above may be used together with a resin composition as required. Examples include a leveling agent, an antifoaming agent, a coupling agent, an antioxidation agent, an antioxidation auxiliary agent, a fluorescent agent, a dye, a pigment and the like. Further, organic or inorganic fine filler having an average particle size of 5 nm-5 μm may be added. In this case, effects can be invested, for example, reduction of a linear expansion coefficient or, increase and decrease of a refractive index for a cured product of the resin composition; improvement of incombustibility for the composition; improvement of strength or hardness; improvement of adherence to the surface of other substances such as a metal; and the like.

[Resin Composition for Forming a Core]

Below, respective components for a resin composition for forming a core will be explained.

Fundamentally, this resin composition is greatly different from a resin composition for a clad only in a point where a refractive index of a cured product for a core is higher than that for a clad. Since most of contents are similar to the resin composition for a clad, different points are explained below.

(Formulation for Adjusting a Refractive Index)

For a resin composition for a core, it is required to adopt a formulation making a refractive index after curing higher than that of a clad. One example is a method of increasing a refractive index of a cured epoxy resin by using, in a polymer comprising the epoxy monomer (A) and the non-epoxy monomer (B), raw material monomers also comprising a (meth)acrylate monomer with an aromatic skeleton. Even when a polymer identical to that in a resin composition for a clad is used, for example, a composition may be prepared in which a content of another epoxy resin having an aromatic skeleton is increased. Further, examples without using a polymer the same as that used in a resin composition for a clad include a composition with a high refractive index which does not comprise the polymer used for a resin composition for a clad and comprises other epoxy resin; a composition of resin having a curing system other than curing due to a crosslinking reaction between epoxy groups and having a refractive index after curing higher than that of a clad, such as resin obtained by radically curing a composition having ethylenic double bonds.

[Others]

Below, other components for the dry film according to the present invention will be explained.

(Carrier Film)

As a carrier film which may be used for a dry film according to the present invention, for example, a polyethylene terephthalate film, a polyimide film and a polyether imide film may be used.

(Releasing Film)

As a releasing film which may be used for a dry film according to the present invention, for example, polypropylene may be used. This film may be usually called as a protection film, a cover film, or a separator (film), and is used for preventing a resin composition surface from contamination and damages.

(Flexible Board)

A flexible board which may be used for the present invention is not particularly limited as long as substrates used for a flexible printed circuit board and examples include a polyimide film, a polyether imide film.

EXAMPLES

Example 1

Preparation of Varnish/Fabrication of Dry Film

Glycidyl methacrylate and tetrahydrofurfuryl methacrylate were mixed at a molar ratio of 1:10, and it was radically polymerized to obtain Raw material resin A whose weight-average molecular weight Mn was adjusted to 90,000. 100 parts by weight of Raw material resin A was diluted with 110 parts by weight of methyl isobutyl ketone (MIBK). To 100 parts by weight of the resin content in this dilution, 1 part by weight of a photo-cationic curing agent (CPI-101A produced by San-Apro Ltd.) was added and it was filtered through a membrane filter with a pore size of 1 μm to prepare Epoxy resin varnish 1.

Epoxy resin varnish 1 was applied on a PET film produced by Toyobo Co, Ltd. (Item No. A4100) with a multi-coater equipped with a Comma Coater® head produced by Hirano Tecseed Co., Ltd., it was dried so as to have a predetermined thickness. A releasing film OPP-MA420 produced by Oji Specialty Paper Co., Ltd. was heat-laminated to fabricate a dry film having a resin layer with a thickness of 50 μm.

(Transparency)

The releasing film was stripped from the fabricated dry film, and a stripped surface was exposed with an ultrahigh pressure mercury lamp at a light quantity of 4 J/cm$^2$, and heated at 150° C. for 1 hour to cure. Transparency of this cured film was confirmed with naked eyes to be transparent.

(Patterning Property)

The releasing film was stripped from the fabricated dry film and the resin layer was laminated on a substrate with a vacuum laminator "V-130" produced by Nichigo-Morton Co., Ltd. under the condition at 60° C., 0.2 MPa. Then, a negative mask on which a straight-pattern slit with a width of 35 μm, a length of 120 mm was overlaid on a substrate, it was exposed by irradiating with an ultraviolet light with an ultrahigh pressure mercury lamp at a condition of 3 J/cm$^2$ to photo-cure a region of the resin layer corresponding to the slit. Next, after the PET film was stripped from the resin layer, it was heated at 140° C. for 2 minutes and was developed by using an aqueous flux cleaning agent ("PINE ALPHA ST-100 SX" produced by Arakawa Chemical Industries, Ltd.) adjusted at 55° C. as a developing solution to solubilize and remove unexposed portions of the resin layer, and further it was finishing-rinsed with water and air-blown, followed by drying at 100° C. for 10 minutes. After that, it was observed with naked eyes with magnifying on a microscope and it was confirmed to be patternable.

(Heat Resistance)

As heat resistance, a glass transition temperature (Tg) was evaluated. The releasing film was stripped from the fabricated dry film and it was exposed with an ultrahigh pressure mercury lamp at a light quantity of 4 J/cm$^2$ and heated at 150° C. for 1 hour, and the PET film was stripped. This cured resin layer was cut into 5 mm×50 mm and a peak temperature in a complex elastic modulus (E") was measured as Tg with a visco-elastic spectrometer DMS200 produced by Seiko Electronics Industry Co., Ltd. As a result, it showed Tg at 147° C. and had sufficient heat resistance against normal operating temperature.

(A Bending Property)

A flexible double-sided copper-clad laminates in which copper foils with a thickness of 12 μm were laminated on both sides of a polyimide film with a thickness of 25 μm (FELIOS® (R-F775) produced by Panasonic Corporation) was used and copper foils on the both sides were removed by etching to fabricate a flexible board with a shape size of 130 mm×130 mm. Then, to a whole surface of a glass board with 140 mm×140 mm×2 mm in thickness, a removable double-coated adhesive tape (No. 7692 produced by Teraoka Seisakusho Co., Ltd.) was laminated with its stronger adhesive side by using a compressed air injection type vacuum laminator (V-130 produced by Nichigo-Morton Co., Ltd.) under the conditions of 60° C., 0.2 MPa, and the flexible board was laminated on a weaker adhesive side of the double-coated adhesive tape by using the vacuum laminator "V-130" under the same conditions to temporarily adhere the flexible board on the glass board.

Next, a dry film having a resin layer with a thickness of 50 μm was used and this resin layer was laminated on a surface of the flexible board by using the vacuum laminator V-130 under the same conditions. Then, the resin layer was irradiated with an ultraviolet light with an ultrahigh pressure mercury lamp under the condition of 2 J/cm$^2$ and the PET film was stripped, followed by heating at 150° C. for 30 minutes. Further, after surfaces were treated with oxygen plasma, a coverlay film (a halogen-free coverlay film "R-CAES" produced by Panasonic Corporation: made of polyimide, 125 μm in thickness; an adhesive layer, 15 μm in thickness) was laminated on a surface of the overclad with a vacuum laminator "V-130" under the conditions of 120° C., 0.3 MPa, and it was heated at 160° C., for 1 hour to cure the resin layer.

Then, the glass board was removed from the weak adhesive side of the double-coated tape and cut it with a router to fabricate a substrate for a bending property evaluation in which the resin composition was inserted between the flexible board and the coverlay. This substrate was inserted between boards disposed at an interval of 2 mm and a bending test was carried out for 100,000 cycles at 120 CPM on an IPC tester (MODEL IPC-02 produced by Toyo Seiki Seisaku-sho, Ltd.) to confirm that no breaks occurred.

The resin composition prepared in Example 1 showed excellent in all properties.

Example 2

Preparation of Varnish Added with Liquid Epoxy Resin/Fabrication of Dry Film

Raw material resin A obtained in Example 1 and bisphenol A epoxy resin (EPICLON® 850 S produced by DIC Corporation) which is liquid epoxy resin were stirred to mix at 74 parts by weight:26 parts by weight. 100 parts by weight of this mixture was diluted with 110 parts by weight of methyl isobutyl ketone (MIBK). To 100 parts by weight of the resin content in this dilution, 1 part by weight of a photo-cationic curing agent (CPI-101A produced by San-Apro Ltd.) was added and it was filtered through a membrane filter with a pore size of 1 μm to prepare Epoxy resin varnish 2.

Epoxy resin varnish 2 was applied on a PET film produced by Toyobo Co, Ltd. (Item No. A4100) with a multi-coater equipped with a Comma Coater® head produced by Hirano Tecseed Co., Ltd., it was dried so as to have a predetermined thickness. A releasing film OPP-MA420 produced by Oji Specialty Paper Co., Ltd. was heat-laminated to fabricate a dry film having a resin layer with a thickness of 50 μm.

For an uncured resin layer of the dry film fabricated by using Epoxy resin varnish 2, ductility was evaluated and, further, a patterning property, transparency, heat resistance, a bending property were evaluated for a cured resin layer as Example 1.

(Ductility)

The fabricated dry film was cut with a cutter and dusting from the cut section was observed with naked eyes for evaluation of ductility of the uncured resin layer. For the resin layer formed by using Epoxy resin varnish 1 without addition of liquid epoxy resin, since breaking and dusting were observed when cut with a cutter, it should be handled carefully. However, since the resin layer formed by using Epoxy resin varnish 2 with addition of liquid epoxy resin showed no breaking and dusting and had ductility, it was excellent in a handling property.

The resin composition prepared in Example 2 showed excellent in all properties.

Example 3

With the exception that glycidyl methacrylate and tetrahydrofurfuryl methacrylate in Example 1 were mixed at a molar ratio of 1:3 to obtain Raw material resin B whose weight-average molecular weight Mn was adjusted to 100,000, Epoxy resin varnish 3 was prepared as Example 2 and the respective evaluations were carried out.

Example 4

With the exception that glycidyl methacrylate and tetrahydrofurfuryl methacrylate in Example 1 were mixed at a molar ratio of 1:5 to obtain Raw material resin C whose weight-average molecular weight Mn was adjusted to 100,000, Epoxy resin varnish 4 was prepared as Example 2 and the respective evaluations were carried out.

Example 5

With the exception that glycidyl methacrylate and tetrahydrofurfuryl methacrylate in Example 1 were mixed at a molar ratio of 1:13 to obtain Raw material resin D whose weight-average molecular weight Mn was adjusted to 110,000, Epoxy resin varnish 5 was prepared as Example 2 and the respective evaluations were carried out.

Example 6

With the exception that glycidyl methacrylate and tetrahydrofurfuryl methacrylate in Example 1 were mixed at a molar ratio of 1:20 to obtain Raw material resin E whose weight-average molecular weight Mn was adjusted to 100,000, Epoxy resin varnish 6 was prepared as Example 2 and the respective evaluations were carried out.

Example 7

Epoxycyclohexylmethyl methacrylate and tetrahydrofurfuryl methacrylate were mixed at a molar ratio of 1:10, and it was radically polymerized to obtain Raw material resin F whose weight-average molecular weight Mn was adjusted to 110,000. Raw material resin F obtained and bisphenol A epoxy resin (EPICLON® 850 S produced by DIC Corporation) which is liquid epoxy resin were stirred to mix at 74 parts by weight:26 parts by weight. 100 parts by weight of this mixture was diluted with 110 parts by weight of methyl isobutyl ketone (MIBK). To 100 parts by weight of the resin content in this dilution, 1 part by weight of a photo-cationic curing agent (CPI-101A produced by San-Apro Ltd.) was added and it was filtered through a membrane filter with a pore size of 1 μm to prepare Epoxy resin varnish 7. Respective evaluations were carried out as Example 2.

Example 8

With the exception that as the liquid epoxy resin in Example 2, bisphenol A epoxy resin was replaced with hydrogenated bisphenol A epoxy resin, Epoxy resin varnish 8 was prepared and the respective evaluations were carried out.

Example 9

Glycidyl methacrylate and tetrahydrofurfuryl methacrylate were mixed at a molar ratio of 1:5, and it was radically polymerized to obtain Raw material resin G whose weight-average molecular weight Mn was adjusted to 220,000. Raw material resin G obtained and bisphenol A epoxy resin (EPICLON® 850 S produced by DIC Corporation) which is liquid epoxy resin were stirred to mix at 80 parts by weight:20 parts by weight. 100 parts by weight of this mixture was diluted with 110 parts by weight of methyl isobutyl ketone (MIBK). To 100 parts by weight of the resin content in this dilution, 1 part by weight of a photo-cationic curing agent (CPI-101A produced by San-Apro Ltd.) was added and it was filtered through a membrane filter with a pore size of 1 μm to prepare Epoxy resin varnish 9. Respective evaluations were carried out as Example 2.

Example 10

Glycidyl methacrylate and tetrahydrofurfuryl methacrylate were mixed at a molar ratio 1:10, and it was radically polymerized to obtain Raw material resin H whose weight-average molecular weight Mn was adjusted to 220,000. With the exception that Raw material resin H was used, Epoxy resin varnish 10 was prepared as Example 9. Respective evaluations were carried out as Example 2.

Example 11

Glycidyl methacrylate and tetrahydrofurfuryl methacrylate were mixed at a molar ratio 1:13, and it was radically polymerized to obtain Raw material resin I whose weight-average molecular weight Mn was adjusted to 220,000. With the exception that Raw material resin H was used, Epoxy resin varnish 11 was prepared as Example 9. Respective evaluations were carried out as Example 2.

Comparative Example 1

As a comparative example, glycidyl methacrylate and tetrahydrofurfuryl acrylate were mixed at a molar ratio 1:10, it was radically polymerized to obtain Raw material resin J whose molecular weight Mn was adjusted to 450,000. Raw material resin J was used to prepare Epoxy resin varnish 12 as Example 1.

As a result, Comparative example 1 was excellent in a patterning property, transparency. However, with respect to a bending property, breaking occurred at 100,000 cycles and heat resistance was low as a glass transition temperature was 27° C.

Comparative Example 2

Raw material resin J obtained in Comparative example 1 and bisphenol A epoxy resin (EPICLON® 850 S produced by DIC Corporation) which is liquid epoxy resin were stirred to mix at 74 parts by weight:26 parts by weight. 100 parts by weight of this mixture was diluted with 110 parts by weight of methyl isobutyl ketone (MIBK). To 100 parts by weight of the resin content in this dilution, 1 part by weight of a photo-cationic curing agent (CPI-101A produced by San-Apro Ltd.) was added and it was filtered through a membrane filter with a pore size of 1 μm to prepare Epoxy resin varnish 13.

Epoxy resin varnish 13 was applied on a PET film produced by Toyobo Co, Ltd. (Item No. A4100) with a multicoater equipped with a Comma Coater® head produced by Hirano Tecseed Co., Ltd., it was dried so as to have a predetermined thickness. A releasing film OPP-MA420 produced by Oji Specialty Paper Co., Ltd. was heat-laminated to fabricate a dry film having a resin layer with a thickness of 50 μm.

For an uncured resin layer formed by using Epoxy resin varnish 13 and its cured resin layer, ductility of the uncured resin layer and a patterning property, transparency, heat resistance, a bending property were evaluated as Example 2.

Comparative Example 3

With the exception that glycidyl methacrylate in Comparative example 1 and tetrahydrofurfuryl methacrylate were mixed at a molar ratio of 1:5 to obtain Raw material resin K whose weight-average molecular weight Mn was adjusted to 210,000, Epoxy resin varnish 14 was prepared as Comparative Example 2 and the respective evaluations were carried out.

The above formulations are shown in Tables 1 and 2 and the evaluation results for the respective properties are shown in Table 3.

TABLE 1

| | Formulation of raw material resins (molar ratio) | | | | | |
|---|---|---|---|---|---|---|
| | Epoxy monomer | | Non-epoxy monomer | | Properties | |
| Raw material resin | Glycidyl methacrylate | Epoxycyclohexylmethyl methacrylate | Tetrahydrofurfuryl methacrylate | Tetrahydrofurfuryl acrylate | Epoxy equivalent (g/eq) | Weight-average molecular weight (Mn) |
| A | 1 | | 10 | | 1822 | 90000 |
| B | 1 | | 3 | | 645 | 100000 |
| C | 1 | | 5 | | 981 | 100000 |
| D | 1 | | 13 | | 2327 | 110000 |
| E | 1 | | 20 | | 3504 | 100000 |
| F | | 1 | 10 | | 1876 | 110000 |
| G | 1 | | 5 | | 981 | 220000 |
| H | 1 | | 10 | | 1822 | 220000 |
| I | 1 | | 13 | | 2327 | 200000 |
| J | 1 | | | 10 | 1682 | 450000 |
| K | 1 | | | 5 | 911 | 210000 |

TABLE 2

| | | Raw material resin | | Liquid epoxy resin | | Photocationic curing agent |
|---|---|---|---|---|---|---|
| | Resin varnish | Type | Content (part by weight) | Type | Content (part by weight) | Content (part by weight) |
| Example 1 | 1 | A | 100 | — | — | 1 |
| Example 2 | 2 | A | 74 | BISA | 26 | 1 |
| Example 3 | 3 | B | 74 | BISA | 26 | 1 |
| Example 4 | 4 | C | 74 | BISA | 26 | 1 |
| Example 5 | 5 | D | 74 | BISA | 26 | 1 |
| Example 6 | 6 | E | 74 | BISA | 26 | 1 |
| Example 7 | 7 | F | 74 | BISA | 26 | 1 |
| Example 8 | 8 | A | 74 | Hydrogenated BISA | 26 | 1 |
| Example 9 | 9 | G | 80 | BISA | 20 | 1 |
| Example 10 | 10 | H | 80 | BISA | 20 | 1 |
| Example 11 | 11 | I | 80 | BISA | 20 | 1 |
| Comparative Example 1 | 12 | J | 100 | — | — | 1 |
| Comparative Example 2 | 13 | J | 74 | BISA | 26 | 1 |
| Comparative Example 3 | 14 | K | 74 | BISA | 26 | 1 |

BISA: Bisphenol A epoxy resin (EPICLON[R] 850S produced by DIC Corporation)
Hydrogenated BISA: Hydrogenated bisphenol A epoxy resin Photo-cationic curing agent (CPI-101A produced by San-Apro Ltd.)

TABLE 3

| | Patterning property | Transparency | A bending property | Heat resistance Tg (° C.) | Refractive index | Ductility of uncured resin layer |
|---|---|---|---|---|---|---|
| Example 1 | ○ | ○ | ○ | 147 | 1.49 | Δ |
| Example 2 | ○ | ○ | ○ | 150 | 1.52 | ○ |
| Example 3 | ○ | ○ | ○ | 161 | 1.52 | ○ |
| Example 4 | ○ | ○ | ○ | 161 | 1.52 | ○ |
| Example 5 | ○ | ○ | ○ | 118 | 1.52 | ○ |
| Example 6 | ○ | ○ | ○ | 107 | 1.52 | ○ |
| Example 7 | ○ | ○ | ○ | 121 | 1.52 | ○ |
| Example 8 | ○ | ○ | ○ | 167 | 1.49 | ○ |
| Example 9 | ○ | ○ | ○ | 156 | 1.51 | ○ |
| Example 10 | ○ | ○ | ○ | 145 | 1.51 | ○ |
| Example 11 | ○ | ○ | ○ | 140 | 1.51 | ○ |
| Comparative Example 1 | ○ | ○ | x | 35 | 1.49 | Δ |

TABLE 3-continued

|  | Patterning property | Transparency | A bending property | Heat resistance Tg (° C.) | Refractive index | Ductility of uncured resin layer |
|---|---|---|---|---|---|---|
| Comparative Example 2 | ○ | ○ | x | 27 | 1.52 | ○ |
| Comparative Example 3 | ○ | ○ | ○ | 62 | 1.52 | ○ |

For a patterning property and transparency observed with naked eyes, all of the resin compositions of Examples 1-11 and Comparative examples 1-3 showed good results.

For a bending property of a cured resin layer, all of the resin composition of Examples 1-11 showed good results. Cured resin layers of the resin compositions of Comparative examples 1 and 2 were found to be poor in a bending property. The resin composition of Comparative example 3 showed good results.

For heat resistance, all of the resin compositions of Examples 1-11 showed a glass transition temperature higher than 100° C., and had sufficient heat resistance against normal operating temperature. The resin compositions of Comparative examples 1-3 showed very low glass transition temperatures and it was found to be poor in heat resistance.

For ductility of an uncured resin layer, the resin compositions of Example 1 and Comparative example 1, which do not comprise liquid epoxy resin, showed good results. The resin compositions of Examples 2-11 and Comparative examples 2-3, which comprise liquid epoxy resin, showed very good results.

Example 12

(Preparation of Varnish and Formation of Film/Evaluation of Material Properties)

According to the formulations in Table 4, each of materials was weighed into a glass vessel, it was solubilized by refluxing at 60° C., followed by filtering it through a PTFE membrane filter with an opening of 1 μm to prepare varnish. Then, this varnish was applied on a surface of a PET film produced by Toyobo Co, Ltd. (Item No. A4100) with a multicoater equipped with a Comma Coater® head produced by Hirano Tecseed Co., Ltd., it was dried to fabricate a dry film for a core, which had a resin layer with a thickness of 30 μm.

Further, refractive indexes and Tgs (glass transition temperatures) for the resin layer of the dry film for a clad and the resin layer of the dry film for a core were measured, and results are shown in Table 3 and Table 4, respectively.

Measurement of a refractive index was carried out as follows. As above, a resin layer formed on a surface of a PET film so as to have a thickness of 80 μm was laminated on a smooth surface of a high refractive-index glass board (refractive index 1.6) with 30 mm×10 mm×4 mm in thickness by using a compressed air injection type vacuum laminator (V-130 produced by Nichigo-Morton Co., Ltd.) under the conditions of 60° C., 0.2 MPa, it was exposed by irradiating with an ultraviolet light with an ultrahigh pressure mercury lamp at a condition of 2 J/cm², after the PET film was stripped, heating at 150° C. for, 1 minutes was carried out. Then, the surface of the film was polished to make it smooth and a refractive index of the cured resin layer was measured on a refractometer produced by Atago Co., Ltd.

Measurement of Tg was carried out as follows. As above, a resin layer formed on a surface of a PET film so as to have a thickness of 80 μm was exposed by irradiating an ultraviolet light with an ultrahigh pressure mercury lamp at a condition of 2 J/cm², it was heated at 100° C. for 5 minutes, followed by stripping the PET film and then only the resin layer was heated at 150° C. for 1 hour. This cured resin layer was cut into a size of 5 mm×50 mm and a peak temperature in a complex elastic modulus (E") was measured as Tg on a visco-elastic spectrometer DMS200 produced by Seiko Electronics Industry Co., Ltd.

TABLE 4

|  | Raw material | Formulation |
|---|---|---|
| Resin composition (weight %) | a | 61 |
|  | b | 26 |
|  | c | 3 |
|  | d | 10 |
| Sum of resins |  | 100 |
| Photo-curing agent | e | 0.5 |
| Surface conditioner | g | 0.1 |
| Solvent | h | 30 |
|  | i | 70 |
| Tg (° C.) |  | 130 |
| Refractive index |  | 1.58 |

Raw material a: "Epikote$^R$ 100 6FS" produced by Japan Epoxy Resin Corporation
Raw material b: "EPICLON$^R$ 850S" produced by Dainippon Ink and Chemicals, Inc.
Raw material c: "YP50" produced by Tohto Chemical Industry, Co., Ltd.
Raw material d: "Celloxide$^R$ 2081" produced by Daicel Corporation
Raw material e: "SP-170" (SbF$_6$-sulfonium salt) produced by Adeka Corporation
Raw material f: "SI-150L" (SbF$_6$-sulfonium salt) produced by Sanshin Chemical Industry Co., Ltd.
Raw material g: "F470" produced by Dainippon Ink and Chemicals, Inc.
Raw material h: MEK
Raw material i: toluene

Example 13

(Manufacture of Waveguide)

An optical waveguide is generally constituted with a clad formed on a flexible substrate on which circuits are formed such as a flexible printed circuit board; and a core which is enveloped with the clad. Since the refractive index of the clad was set to be lower than the refractive index of the core, a light which entered from an edge reaches the other end of the core with total reflection at an interface between the core and the clad.

Epoxy resin varnish 2 used in Example 2 was applied on a PET film produced by Toyobo Co, Ltd. (Item No. A4100) with a multicoater equipped with a Comma Coater® head produced by Hirano Tecseed Co., Ltd., it was dried so as to have a predetermined thickness. A releasing film OPP-MA420 produced by Oji Specialty Paper Co., Ltd. was heat-laminated to fabricate a dry film for a clad, which had a resin layer with a thickness of 10 μm or 40 μm.

As Example 12, varnish prepared according to the formulation in Table 4 was applied on a PET film produced by Toyobo Co, Ltd. (Item No. A4100) with a multicoater equipped with a Comma Coater' head produced by Hirano Tecseed Co., Ltd., it was dried so as to have a predetermined thickness. A releasing film OPP-MA420 produced by Oji Specialty Paper Co., Ltd. was heat-laminated to fabricate a dry film for a core, which had a resin layer with a thickness of 30 μm.

A method of manufacturing an optical waveguide A by using two types of dry films for a clad and for a core will be explained.

First, on a surface of Flexible board 10 on which Circuit 11 is formed, such as a flexible printed circuit board, Resin layer 1a of a dry film for a clad was laminated [FIG. 1(a)].

Next, Resin layer 1a of the dry film for a clad was cured by irradiating with a light such as an ultraviolet light or by heating to form a layer of Underclad 3a on a surface of Substrate 10 [FIG. 1(b)].

Alternatively, a clad may be patterned by irradiating with a light capable of photocuring such as an ultraviolet light through a mask in which a predetermined shape slit is formed. In this case, Resin layer 1a of the dry film for a clad is exposed by using a photo mask for a clad pattern (not shown). After thus exposing, Resin layer 1a of the dry film for a clad was developed, an unexposed part of the resin layer was removed to form a clad which was photo-cured by exposure into a predetermined pattern shape on a substrate.

Next, Resin layer 2 of the dry film for a core was laminated on a surface of Underclad 3a, Photo mask 13 in which Slit 12 for a core pattern is formed was overlaid, and the resin layer of the dry film for a core was exposed by irradiating with a light capable of photocuring such as an ultraviolet light through Slit 12 to pattern a core [FIG. 1(c)].

After thus exposing, Resin layer 2 of the dry film for a core was developed, an unexposed part of the resin layer of the dry film for a core was removed to form Core 4 which was photo-cured by exposure in a predetermined pattern shape on a surface of Underclad 3a [FIG. 1(d)].

Additionally, in the present invention, development may be carried out by using an aqueous flux cleaning agent as a developer. Further, exposure may be carried out by photo-irradiation by using a mask as above as well as in a direct drawing system by scanning a pattern with a laser beam.

After this, Resin layer 1b of the dry film for a clad was laminated to overlay it on Underclad 3a so as to cover Core 4 [FIG. 1(e)].

The resin layer of the dry film for a clad was cured by irradiating with a light or heating to form a layer of Overclad 3b [FIG. 1(f)].

An optical waveguide, in which Core 4 is buried within Clad 3 consisting of Underclad 3a and Overclad 3b, was thus manufactured on a surface of Substrate 10. Then, this optical waveguide is made flexible and, when a flexible printed circuit board having circuits is used as a substrate, a photoelectric composite flexible wiring board may be obtained.

Upon manufacturing Optical waveguide A as above, clads and cores may be formed by a lamination process laminating a resin layer of a dry film for a clad or a dry film for a core. Optical waveguides may be manufactured at high productivity without involving a step such as spin coating. Further, since clads and cores are formed uniformly and precisely in its thickness by using a dry film for a clad or a dry film for a core.

Example 14

(Manufacture of a Photoelectric Composite Wiring Board)

A flexible double-sided copper-clad laminates in which copper foils with a thickness of 12 μm were laminated on both sides of a polyimide film with a thickness of 25 μm (FELIOS® (R-F775) produced by Panasonic Corporation) was used and patterning was carried out on one side of the copper foils to form Circuit 11, and the other side of the copper foils was removed by etching to fabricate Flexible board 10 which is a flexible printed circuit board with a shape size of 130 mm×130 mm [FIG. 2(a)].

Then, to a whole surface of a glass board with 140 mm×140 mm×2 mm in thickness, Removable double-coated adhesive tape 17 (No. 7692 produced by Teraoka Seisakusho Co., Ltd.) was laminated with its stronger adhesive side by using a compressed air injection type vacuum laminator (V-130 produced by Nichigo-Morton Co., Ltd.) under the conditions of 60° C., 0.2 MPa, and the flexible board with its surface on which circuits are formed was laminated on a weaker adhesive side of the double-coated adhesive tape 17 by using the vacuum laminator "V-130" under the same conditions to temporarily adhere Flexible board 10 on Glass board 16 [FIG. 2(b)].

Next, a dry film for a clad having a resin layer with a thickness of 10 μm was used to laminate Resin layer 1a of this dry film for a clad on the surface without forming circuit of the flexible board with a vacuum laminator "V-130" under the same conditions as above. Then, Resin layer 1a of the dry film for a clad was irradiated with ultraviolet light from an ultrahigh pressure mercury lamp under the condition of 2 J/cm² and further, after the PET film was stripped, it was heated at 150° C. for 30 minutes, and oxygen plasma treatment was carried out to form Underclad 3a which is a cured resin layer of the dry film for a clad [FIG. 2(c)].

Next, a dry film for a core having a resin layer with a thickness of 30 μm was used to laminate Resin layer 2 of this dry film for a core on the surface of Underclad 3a with a vacuum laminator "V-130" under the same conditions as above. Then, Photo mask 13 in which Slit 12 with a linier pattern of 30 μm in width, 120 mm in length is formed was overlaid on a surface of Resin layer 2 of the dry film for a core, and was exposed by irradiating with an ultraviolet light with an ultrahigh pressure mercury lamp under the condition of 3 J/cm² to photo-cured a part corresponding to a slit of Photo mask 13 [FIG. 2(d)].

Next, after the PET film was stripped from the resin layer, it was heated at 140° C. for 2 minutes and was developed by using an aqueous flux cleaning agent ("PINE ALPHA ST-100 SX" produced by Arakawa Chemical Industries, Ltd.) adjusted at 55° C. as a developing solution to solubilize and remove unexposed portions of the resin layer, and further it was finishing-rinsed with water and air-blown, followed by drying at 100° C. for 10 minutes to form a core [FIG. 2(e)].

Further, after development as above, a surface condition of the underclad was observed with naked eyes and appearance of the core was observed with a stereoscopic microscope.

Next, at positions of 10 mm from both edges of the core, micromirrors which change a direction of a guided wave at 90° were formed [FIG. 2(f)].

Specifically, first, a rotational blade with an apex angle for a cutting edge of 90° ("#5000" blade produced by Disco Corporation) was used and it was moved under conditions of a rotation number of 10000 rpm and a movement speed of 0.1 mm/s to form V-shape grooves 19 with a depth of 40 μm at positions of 10 mm from both edges of Core 4. Second, a solution obtained by diluting varnish for a "clad material" 50 folds with a solvent of toluene:MEK=3:7 was thinly applied to the V-shape grooves with a brush, it was dried at 100° C. for 30 minutes, followed by exposure by irradiating with an ultraviolet light with an ultrahigh pressure mercury lamp under conditions of 1 J/cm², and further it was heated at 120° C. for 10 minutes to smooth the V-shape grooves. After that, a metal mask which has an opening only for the portions of the V-shape grooves was overlaid and gold was deposited in vacuo to form Micromirrors 20 with a gold film with a thickness of 1000 Å on surfaces of the V-shape grooves.

Next, Resin layer 1*b* of the dry film for a clad which has a resin layer with a thickness of 40 μm was laminated on Core 4 in which Micromirrors 20 are formed with a vacuum laminator "V-130" under the conditions of 80° C., 0.3 MPa. Then, after it was heated at 120° C. for 30 minutes, Resin layer 1*b* of the dry film for a clad was irradiated with an ultraviolet light from an ultrahigh pressure mercury lamp under the condition of 2 J/cm² and further, after the PET film was stripped, it was heated at 150° C. for 30 minutes to cure Resin layer 1*b* of the dry film for a clad to form Overclad 3*b* [FIG. 2(*g*)].

Figure 2:
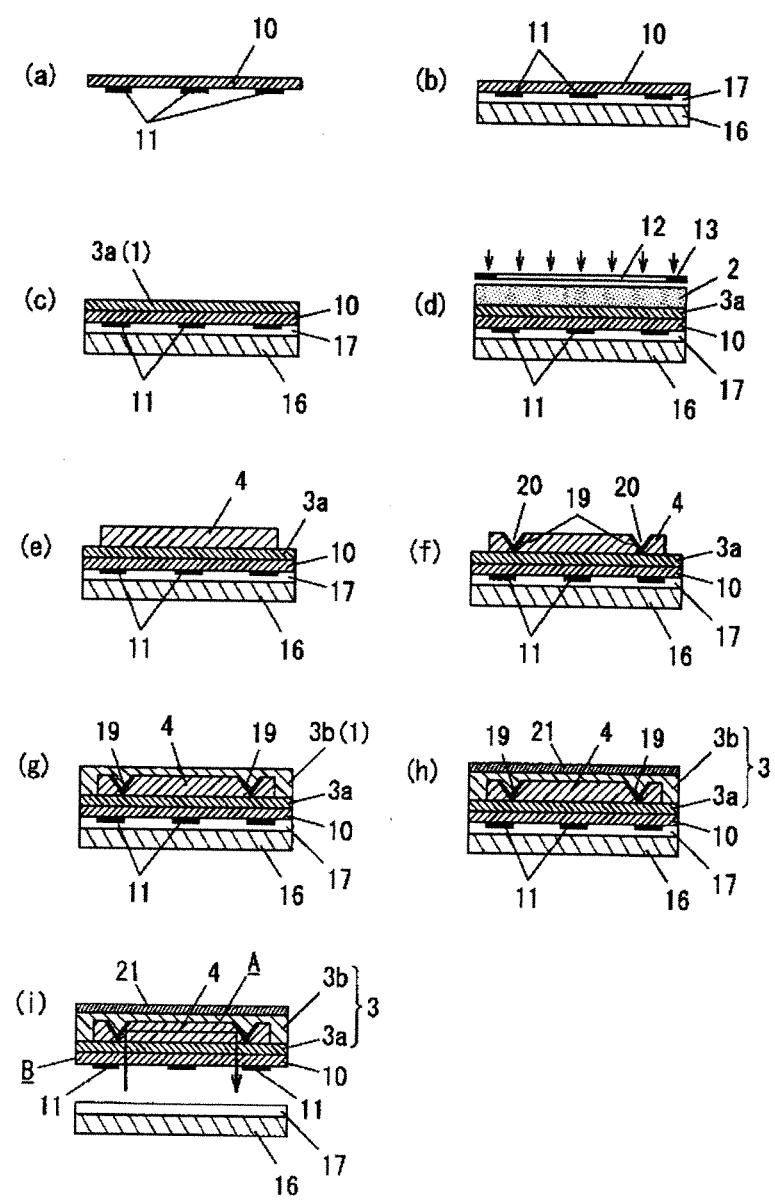
FIG. 2 is a schematic illustration demonstrating a method of manufacturing a photoelectric composite wiring board by using a dry film.

After surfaces of Overclad 3*b* thus formed on the core were treated with oxygen plasma, Coverlay film 21 (a halogen-free coverlay film "R-CAES" produced by Panasonic Corporation: made of polyimide, 125 μm in thickness; an adhesive layer, 15 μm in thickness) was laminated on a surface of Overclad 3*b* with a vacuum laminator "V-130" under the conditions of 120° C., 0.3 MPa, and it was heated at 160° C. for 1 hour to cure adhesive of Coverlay film 21 [FIG. 2(*h*)].

Then, the glass board was removed from the weaker adhesive side of the double-coated adhesive tape and cut it with a router to obtain a photoelectric composite flexible wiring board, in which an optical waveguide was manufactured by burying Core 4 within Clad 3 consisting of Underclad 3*a* and Overclad 3*b*, was formed on a surface of a flexible board with circuits [FIG. 2(*i*)].

Additionally, in this photoelectric composite flexible wiring board, a light path of a guided light entering into and exiting from the optical waveguide is shown with an arrow in FIG. 2(*i*).

(Evaluations of Loss and a Bending Property)

Optical loss and bending resistance were measured. Measurement of optical loss was carried out as follows. On a surface of a flexible board of a photoelectric composite flexible wiring board, an end of an optical fiber with a core diameter of 10 μm, NA 0.21 was connected to a portion corresponding a micromirror at one edge of the core via silicone oil as matching oil and an end of an optical fiber with a core diameter of 200 μm, NA 0.4 was connected to a portion corresponding a micromirror at the other edge of the core via silicone oil as matching oil. A light from an LED light source with a wavelength of 850 nm was entered into the optical waveguide A through the optical fiber with a core diameter of 10 μm, NA 0.21 and a power of light exiting through the optical fiber with a core diameter of 200 μm, NA 0.4 (P1) was measured on a power meter. In addition, end surfaces of the both optical fibers were directly contacted and a power of light without the optical waveguide intervening (P0) was measured on a power meter. Then, from an equation of −10 log(P1/P0), an insertion loss of the optical composite flexible wiring board was calculated. Further, in order to measure an optical loss only for a portion of the optical waveguide on the photoelectric composite flexible wiring board, the micromirror portions at the both edges on the photoelectric composite flexible wiring board were cut off so that an optical waveguide with a length of 100 mm, at the both edges of which edges core surfaces of 40 μm×40 μm emerged. As above, optical fibers were respectively connected to the respective edge surfaces of the core. A power of a light exiting through the optical waveguide (P1) and a power of light without the optical waveguide intervening (P0) were measured. Then, from an equation of −10 log(P1/P0), an insertion loss of the optical waveguide was calculated.

It was found that any formulation showed a waveguide loss lower than 0.1 dB/cm and was excellent in transparency.

1 Resin layer of a dry film for a clad
2 Resin layer of a dry film for a core
3 Clad
3*a* Underclad
3*b* Overclad
4 Core
10 Substrate
11 Circuit
12 Slit
13 Photo mask
16 Glass board
17 Removable double-coated adhesive tape
19 V-shape groove
20 Micromirror.

What is claimed is:

1. An optical waveguide comprising a core and a clad enveloping the core, wherein at least the clad is a cured product by epoxy crosslinking a polymer comprising a (meth)acrylate monomer with an epoxy group (A) which is epoxycyclohexylmethyl (meth)acrylate represented by the general formula (2):

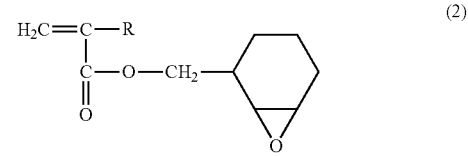

wherein R denotes hydrogen or a methyl group; glycidyl (meth)acrylate represented by the general formula (3):

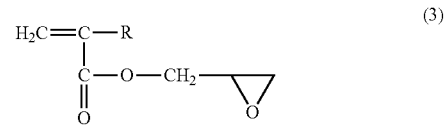

wherein R denotes hydrogen or a methyl group; or a mixture thereof, and a (meth)acrylate monomer without an epoxy group (B) represented by the general formula (1):

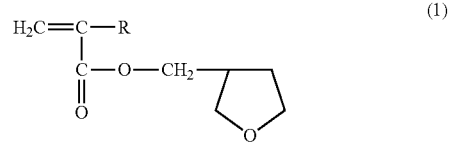

wherein R denotes hydrogen or a methyl group.

2. The optical waveguide of claim 1, wherein a formulation ratio of a (meth)acrylate monomer with an epoxy group (A) and a (meth)acrylate monomer without an epoxy group (B) is a molar ratio of 1:1-1:20.

3. The optical waveguide of claim 2, wherein a weight-average molecular weight of the polymer is 50,000-500,000.

4. The optical waveguide of claim 1, wherein a weight-average molecular weight of the polymer is 50,000-500,000.

5. A dry film comprising at least a carrier film and an uncured resin layer of an epoxy resin composition, which is formed as a film on the carrier film, wherein the epoxy resin composition contains a polymer comprising a (meth)acrylate monomer with an epoxy group (A) which is epoxycyclohexylmethyl (meth)acrylate represented by the general formula (2):

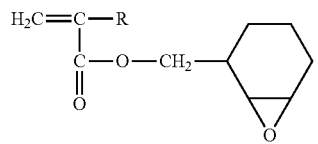

wherein R denotes hydrogen or a methyl group; glycidyl (meth)acrylate represented by the general formula (3):

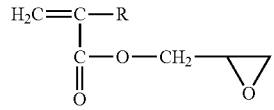

wherein R denotes hydrogen or a methyl group; or a mixture thereof, and a (meth)acrylate monomer without an epoxy group (B) represented by the general formula (1):

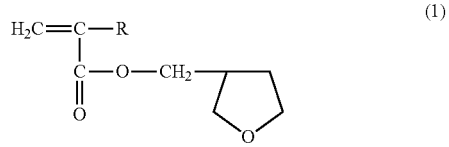

wherein R denotes hydrogen or a methyl group.

6. The dry film of claim 5, wherein a formulation ratio of a (meth)acrylate monomer with an epoxy group (A) and a (meth)acrylate monomer without an epoxy group (B) is a molar ratio of 1:1-1:20.

7. The dry film of claim 6, wherein a weight-average molecular weight of the polymer is 50,000-500,000.

8. The dry film of claim 7, wherein the epoxy resin composition contains 5-35 weight % of liquid epoxy resin with respect to the whole resin composition.

9. The dry film of claim 6, wherein the epoxy resin composition contains 5-35 weight % of liquid epoxy resin with respect to the whole resin composition.

10. The dry film of claim 5, wherein a weight-average molecular weight of the polymer is 50,000-500,000.

11. The dry film of claim 10, wherein the epoxy resin composition contains 5-35 weight % of liquid epoxy resin with respect to the whole resin composition.

12. The dry film of claim 5, wherein the epoxy resin composition contains 5-35 weight % of liquid epoxy resin with respect to the whole resin composition.

* * * * *